United States Patent
Kolmschlag et al.

(10) Patent No.: US 6,683,255 B2
(45) Date of Patent: Jan. 27, 2004

(54) EXTRUDED POLYTETRAFLUOROETHYLENE FOAM

(75) Inventors: Gunter Kolmschlag, Altötting (DE); Armin Steurer, Tittmoning (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/914,506

(22) PCT Filed: Jan. 24, 2001

(86) PCT No.: PCT/US01/02303
§ 371 (c)(1), (2), (4) Date: Aug. 28, 2001

(87) PCT Pub. No.: WO01/54879
PCT Pub. Date: Aug. 2, 2001

(65) Prior Publication Data
US 2003/0011958 A1 Jan. 16, 2003

(51) Int. Cl.$^7$ ................................. H01B 3/00
(52) U.S. Cl. ................................. 174/110 FC
(58) Field of Search ........... 174/110 F, 110 FC, 174/110 R; 264/154; 156/51

(56) References Cited

U.S. PATENT DOCUMENTS

| | | | |
|---|---|---|---|
| 3,953,566 A | 4/1976 | Gore | 264/288 |
| 4,187,390 A | 2/1980 | Gore | 174/102 R |
| 4,663,095 A * | 5/1987 | Battais | 156/244.12 |
| 4,826,725 A | 5/1989 | Harlow | 428/375 |
| 4,866,212 A * | 9/1989 | Ingram | 174/110 F |
| 5,474,727 A * | 12/1995 | Perez | 264/154 |
| 5,609,703 A * | 3/1997 | Hamada et al. | 156/214 |

FOREIGN PATENT DOCUMENTS

| | | | |
|---|---|---|---|
| DE | 1 769 315 | 6/1971 | C08F/47/08 |
| EP | 0 113 869 B1 | 7/1984 | C08J/9/28 |
| EP | 0 271 990 A | 6/1988 | H01B/3/44 |
| EP | 0 513 500 A1 | 11/1992 | C08J/9/26 |
| EP | 0 808 865 A2 | 11/1997 | C08J/9/28 |
| EP | 0 908 487 A2 | 4/1999 | C08J/9/00 |
| JP | B-67013560 | 8/1967 | |
| JP | 54-85267 * | 7/1979 | |
| JP | 54-111569 A * | 8/1979 | |
| JP | B-82030059 | 6/1982 | |
| JP | A 11-124458 | 5/1999 | C08J/9/06 |
| WO | WO 91/12123 | 8/1991 | B29C/47/02 |
| WO | WO 96/34400 | 10/1996 | H01B/7/00 |

OTHER PUBLICATIONS

PTFE Processing Brochure: ®Hostaflon Plastics from Hoechst AG.

* cited by examiner

*Primary Examiner*—Chau N. Nguyen
(74) *Attorney, Agent, or Firm*—Dean M. Harts; James V. Lilly

(57) ABSTRACT

The preparation, processing and use of foamed polytetrafluoroethylene is described. Extrusion of polytetrafluoroethylene with a foaming agent gives a product which can be used in the electrical industry, in the chemical industry or in chemical or plant engineering. The advantage over other processes is that the product can be prepared in a simple manner. Possible application sectors are cables, coaxial cables, gaskets, filters, filter screens, membranes and absorbers.

10 Claims, 1 Drawing Sheet

EXTRUDED POLYTETRAFLUOROETHYLENE FOAM

FIELD

The present invention relates to coaxial cables for the high-frequency sector and to the production of polytetrafluoroethylene (PTFE) foam, in particular as cable insulation, a dielectric or a molded gasket.

BACKGROUND

Cable insulation should have the lowest possible dielectric constant $\epsilon_r$ and the lowest possible dissipation factor tan $\delta$.

These requirements are particularly well complied with by PTFE, ideally pure PTFE not modified with comonomers or with long unbranched chains, because contamination with end group branching or comonomers add additional dipoles. The dielectric constant of unsintered PTFE paste material is generally about 1.7 and that of sintered PTFE is generally between 2.05 and 2.1. Another very significant advantage of PTFE cable insulation is that, unlike polyvinyl chloride, polyethylene or polypropylene, it is incombustible.

Cable production generally proceeds by paste extrusion as in "Verarbeitunigsbroschüre PTFE, ®Hostaflon Kunststoffe der Hoechst AG [PTFE processing brochure: ®Hostaflon Plastics from Hoechst AG], December 1986". However, this paste is not processed thermoplastically, rather its ability to be deformed is increased through the addition of lubricants. For further improvement in electrical properties, JP-B 42-13560 and U.S. Pat. No. 4,187,390 propose that paste extrusion be followed by a stretching process. The oriented tapes have a structure which permits the production of aerated cable sheathing, their density consequently being lower than that of conventional PTFE. There is a corresponding improvement in electrical properties. However, four steps are then required in the process, namely extrudate production, extrudate calendering tape stretching and winding the tape around a wire. This process is therefore costly and time-consuming.

To reduce the density further, JP-B 57-30059 proposes adding up to 15% of foaming agents. The plastic (PTFE) foamed in that publication is not thermoplastically processible. It is usually only thermoplastically processible materials which are physically or chemically foamed. With an additional foaming procedure, the process is still more complicated.

EP-A-808 865 teaches that besides thermoplastic processible fluoropolymer, PTFE can also be foamed with super critical $CO_2$. However, in this process the fluoropolymer is first formed into the desired shape and only subsequently foamed under sinter conditions.

JP-A 11-124458 moreover proposes foams of suspension product. These have to be peeled from a block before they can be wound up as a tape. Again, this is a complicated process.

WO-A-91/12123 provides a simplified process. The PTFE paste is extruded onto wire and then oriented. However, a disadvantage is that the cable insulation does not adhere to the wire, and the insulation becomes deformed due to lack of dimensional stability when exposed to small mechanical loads, for example if it is handled without sufficient care. Although the dimensional stability can be increased by sintering this leads to other disadvantages, such as compromising the electrical properties, shrinkage losses and elasticity losses.

SUMMARY

It is an object of the present invention to provide a simple process in which the porous PTFE is processed to give coaxial cables with excellent electrical properties.

According to the invention, this object is achieved by extruding a not-melt processible fluoropolymer, in particular PTFE together with a space holder, in particular a foaming agent, such that voids remain subsequent to the removal of the space holder. The space holder and in particular the foaming agent is used in an amount from 20 to 100 parts by weight of space holder or foaming agent for each 100 parts by weight of PTFE.

DETAILED DESCRIPTION

Figure 1:
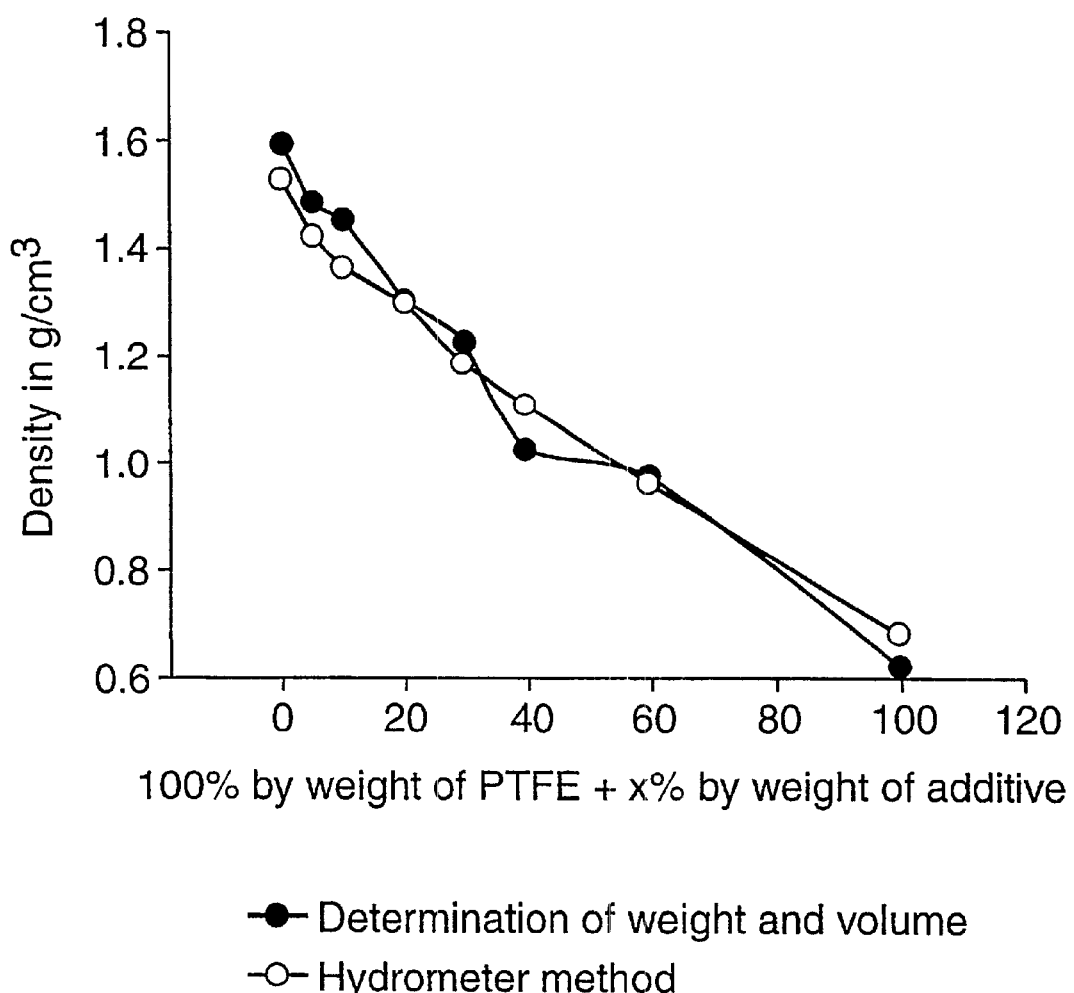
FIG. 1 shows density of the PTFE of the invention plotted with additive amount.

Since PTFE cannot be processed thermoplastically, it cannot be foamed as a usual thermoplastic polymer (e.g. as disclosed in EP-A-908 487). It is thus surprising that nevertheless, PTFE can be formed into a foam using a foaming agent. However, the foaming process in case of PTFE is fundamentally different from that of thermoplastic foams. In case of thermoplasts, the foaming agent expands in the melt thereby building pores. In the process of the invention, the foaming agent only fulfills the role of a space holder during the extrusion. Upon removal of the foaming agent or space holder, a corresponding void is left at the place where the foaming agent previously resided.

Extrusion according to the invention provides a PTFE foam with a density of not more than 1.3 $g/cm^3$, which insulates an electrical conductor without the inconvenience of winding. The novel process merely comprises dry mixing of PTFE, foaming agent and lubricant. In other respects the processing method is identical with known cable extrusion for paste PTFE.

The foamed PTFE is substantively stress-free, and can therefore retain its dimensions during further thermal processing. The crystallinity is generally preserved and is in general more than 90%.

The foamed PTFE is also flexible and dimensionally stable. As a dielectric, it adheres to the conductor. Foams of this type may also in principle be used as filter screens, filters, membranes or adsorbers. They are also suitable as gaskets, in particular between hard, brittle flanges which have uneven surfaces and would spring apart if assembled under high pressure, for example ceramics flanges or enamels. Gaskets may also be provided as sheets, rings, strips or in any other form.

Suitable space holders are compounds that can be removed from an article, in particular by sublimation, evaporation, dissolution, washing out or by decomposing. Preferred are foaming agents that sublime, evaporate or that form volatile degradation products above the extrusion temperature.

Use may be made in particular of the following families of products: azo compounds, such as azodicarbonamide and mixtures with plasticizers or with peroxides, and sulfohydrazides; carbonates, such as sodium carbonate, ammonium carbonate, and hydrogencarbonates, and hartshorn salts; hydrazines, such as trihydrazinotriazine, 4,4'-oxybis (benzenesulfohydrazide), and diphenyl sulfone 3,3'-disulfohydrazide; tetrazoles, such as 5-phenyltetrazole; benzoxazines, such as isatoic anhydride; semicarbazides, such as p-tolylenesulfonylsemicarbazide. Preferably ammonium hydrogen carbonate is used.

PTFE for use in the invention is preferably produced via the emulsion polymerization of TFE. The foaming process can be applied to fluoropolymers that are not melt-processible such as for example TFM®, a fluoropolymer available from Dyneon LLC.

Production of a Dielectric for Coaxial Cable:

Paste material, such as ®Dyneon TF or TFM grades (TF 2071) is provided with a lubricant and mixed with the foaming agent, which has previously been ground to the desired grain size. This mixture is then rolled and compression molded to give a billet or stick. A ram extruder is used to press the billet through a die, through the center of which a wire runs cocurrently. The PTFE is then dried at a suitable temperature, which depends on the lubricant and foaming agent used. An extrusion example is described.

The thickness of the insulation can be controlled via the take-off speed. The dielectric constant $\epsilon_r$ is preferably below 1.6 and the dissipation factor tan $\delta$ below $2 \cdot 10^{-4}$.

Other Advantageous Embodiments:

Surface-Sealed Dielectric:

Open-pored PTFE is converted to a PTFE with a sealed-pore surface by brief sintering at the surface. This gives the dielectric in the coaxial cable sufficient protection from soiling, dusts and liquid substances to maintain its quality in the long term. The semifinished product has substantial dimensional stability.

Increasing the Stability of the Dielectric:

The dielectric made from PTFE foam can be sintered. This gives slight shrinkage of the diameter of the dielectric. The electrical properties achievable are:

a dielectric constant $\epsilon_r$ of 1.7 or below, and a dissipation factor tan $\delta$ of $2 \cdot 10^{-4}$ or below.

These values are usually obtained with unsintered PTFE materials. The material under consideration here, however, is a sintered foam.

Examples are used below to illustrate the invention.

EXAMPLE 1

Production of a Cable:

®Dyneon TF 2071 PTFE paste material is mixed with ammonium hydrogencarbonate from Merck, Darmstadt. The foaming agent is ground in advance to the grain size of 100 to 500 μm, particularly 300 μm. Mixtures are prepared with 100 parts by weight of PTFE and 20, 30 and 40 parts by weight of ammonium hydrogencarbonate. These mixtures are mixed with a typical petroleum spirit for paste processing, ShellSol 100/140. The mixture then stands overnight so that the petroleum spirit distributes uniformly within the PTFE. The PTFE paste, with the foaming agent and the petroleum spirit, is then compression molded to give a stick with 63 mm diameter and 30 cm length, and a ram extruder is used to press this through a die with a diameter of 5 mm. The extrusion speed is 5 m/min.

In the center of the extrusion barrel of the ram extruder there is a mandrel which guides the wire to the die nozzle. The diameter of the electrical conductor is 0.75 mm (AWG 22, 7 strands) and the diameter of the insulation is 5 mm. The extrusion runs with a reduction ratio of 100, with 22 parts by weight of lubricant. The lubricant used comprises the petroleum spirit ShellSol 100/140 usually used for paste extrusion. The PTFE mixture coats the wire at the die, producing a sheathed cable. This product is dried at 160° C. The petroleum spirit escapes and the ammonium hydrogencarbonate breaks down to give low-molecular-weight gaseous substances which escape. The cable insulation securely encloses the electrical conductor. The peel strength of the PTFE insulation on the wire in this cable insulation is 4.0 N at 3 cm, to Siemens standard SN 54 233 of January 1976. Without foaming agent, the pull-off strengths of unsintered PTFE are about 6.5 N at 3 cm, and those of sintered PTFE cable insulation are about 8 N at 3 cm.

The electrical properties of the unsintered foam are:

for 20 parts by weight of ammonium hydrogencarbonate:
$\epsilon_r$=1.53 at 100 MHz,
$\epsilon_r$=1.55 at 15 kHz,
tan $\delta$=$1.7 \cdot 10^{-4}$ for 30 parts by weight of ammonium hydrogencarbonate:
$\epsilon_r$=1.47 at 100 MHz,
$\epsilon_r$=1.49 at 15 kHz,
tan $\delta$=$9 \cdot 10^{-5}$ for 40 parts by weight of ammonium hydrogencarbonate:
$\epsilon_r$=1.45±0.01 at 100 MHz,
$\epsilon_r$=1.45 at 15 kHz,
tan $\delta$=$2 \cdot 10^{-4}$ The accuracy of measurement of tan $\delta$ is of the order of size of the values measured.

The resultant cable can be further processed to give a coaxial cable. For this, a screening is applied to the cable and a protective casing is applied, the cable is cut to the desired length and, if required, provided with plugs.

EXAMPLE 2

Surface-Sealed Dielectric:

Sample preparation, extrusion and drying proceed in a manner similar to that of Example 1. After drying, the surface is sintered for about 0.5 minutes at 360° C. The surface of the open-pored film is sealed, protecting the dielectric against dirt, dust and liquid substances, so that its quality is maintained in the long term.

This is demonstrated using a test ink. A piece of the dielectric is cut out, dipped into the test ink and excess ink is then rinsed off. It was found that the ink had penetrated the unsintered part of the dielectric and could not be washed off. The ink could be washed off without difficulty from the sintered part of the dielectric. No ink had penetrated into the material, proving that the pores have been sealed.

The sintered cable can be further processed as in Example 1 to give coaxial cable.

EXAMPLE 3

Fully Sintered Foam:

Sample preparation, extrusion and drying proceed in a manner similar to that of Example 1. After drying, the dielectric is sintered for from 2 to 5 minutes at 360° C. (depending on the thickness of the dielectric). This gives a closed-pore foam, protecting the dielectric against dirt, dust and liquid substances, so that its quality is maintained in the long term.

The dielectric has become significantly harder and is particularly suitable for applications in which the cable is exposed to mechanical loads.

The sintered cable can be farther processed as in Example 1 to give coaxial cable.

EXAMPLE 4

Production of a Molded gasket:

The preparatory extrusion runs in a manner similar to that of Example 1. An extrudate is produced and directly after drying this can be used as a linear gasket, or it may be further processed. For this, the extrudate is calendered until the resultant sheets have a thickness of from 1 to 2 mm and a width of from 5 to 10 cm or above. The gaskets are stamped out from the sheets. These sheets can also be sintered to harden the foamed and formed gasket. The foam remains in nearly unchanged form.

The table below shows the porosities achieved by various proportions of foaming agent. The left-hand column indicates the proportion of foaming agent. The central and right-hand columns show the resultant densities of the PTFE by two different methods of measurement. In the central column the density is determined via the weight and volume of the sheet, and in the right-hand column it is determined by the hydrometer method to DIN 53479. The corresponding values for the cable insulation materials of Example 1 are comparable.

TABLE

| Proportion of foaming agent by weight 100% PTFE + x% | Density determination by weight and volume in g/cm$^3$ | Density determination by hydrometer method in g/cm$^3$ |
| --- | --- | --- |
| 0 | 1.592 | 1.526 |
| 5 | 1.483 | 1.420 |
| 10 | 1.450 | 1.360 |
| 20 | 1.299 | 1.300 |
| 30 | 1.219 | 1.183 |
| 40 | 1.019 | 1.102 |
| 60 | 0.965 | 0.958 |
| 100 | 0.618 | 0.678 |

FIG. 1 illustrates the table and shows that the two methods of measurement give equally clear results.

EXAMPLE 5

Filter Screens, Filters, Membranes

When Example 1 and Example 4 are used to produce a sheet, this can also be used as a semipermeable material, allowing removal of solids from gases, for example.

EXAMPLE 6

Suitable selection of a foaming agent in Example 1 and processing as in Example 4 permits controlled introduction of catalysts into the membrane material, so that these can purify or absorb gases separated off as in Example 5.

We claim:

1. A process for producing articles of not-melt processible fluoropolymers with a density of not more than 1.3 g/cm$^3$, which consists essentially of extruding said not-melt processible fluoropolymer comprising a solid space holder, removing the space bolder, to form a porous dimensionally stable fluoropolymer; without a step of stretching; and optionally sintering the fluoropolymer.

2. The process as claimed in claim 1, wherein the space holder is removed subsequent to the extrusion of the fluoropolymer.

3. The process as claimed in claim 1 or 2, wherein the step of removing the space holder comprises foaming the space holder at a temperature above the extrusion temperature.

4. The process of claim 1 wherein the space holder is selected from carbonates.

5. The process of claim 1 wherein the space holder is selected from sodium carbonate or ammonium carbonate.

6. The process of claim 1 wherein the space holder is ammonium hydrogen carbonate.

7. The process of claim 1 wherein the step of sintering includes surface sealing.

8. A process for producing electrical cable which consists essentially of extruding electrical conductors with polytetrafluoroethylene comprising a solid foaming agent, removing the foaming agent; without a step of stretching; and optionally sintering the fluoropolymer.

9. A sintered foam of unstretched not-melt processible fluoropolymer with a density of less than 1.8 g/cm$^3$, wherein the fluoropolymer is dimensionally stable, substantially stress-free, and can retain its dimensions during further thermal processing.

10. An unstretched sintered foam of not-melt processible fluoropolymer with a dielectric constant $\epsilon_r < 1.9$, wherein the fluoropolymer is dimensionally stable, substantially stress-free, and can retain its dimensions during further thermal processing.

* * * * *